Jan. 12, 1954 P. L. PERRY 2,665,923
RETRACTABLE TRAILER HITCH
Filed Jan. 30, 1951 2 Sheets-Sheet 1
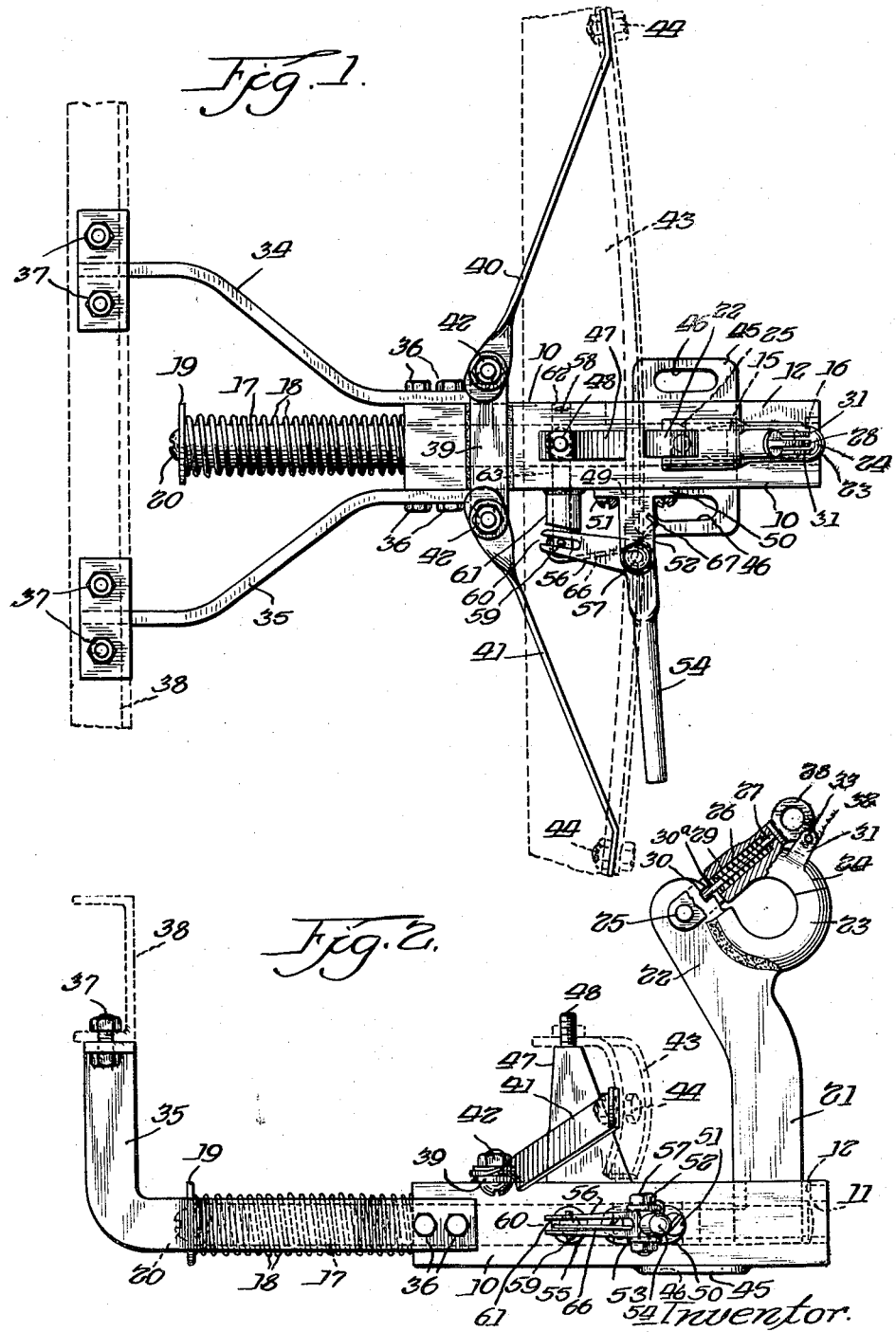
Inventor.
Paul L. Perry.
By Wilkinson Huxley Byron & Hume
Attys.

Jan. 12, 1954   P. L. PERRY   2,665,923
RETRACTABLE TRAILER HITCH
Filed Jan. 30, 1951   2 Sheets-Sheet 2
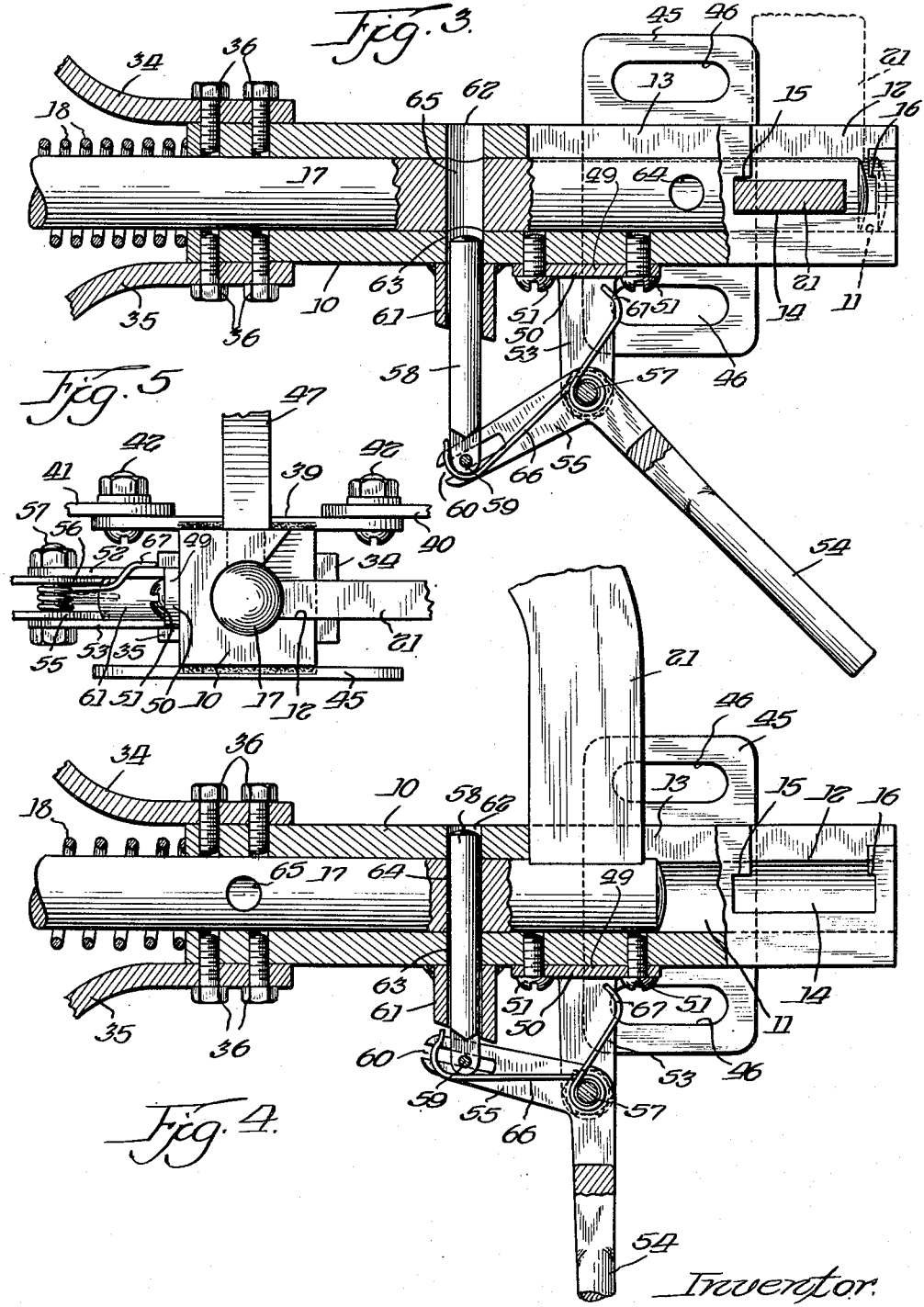
Inventor:
Paul L. Perry Patented Jan. 12, 1954

2,665,923

UNITED STATES PATENT OFFICE 2,665,923

RETRACTABLE TRAILER HITCH

Paul L. Perry, Philadelphia, Pa.

Application January 30, 1951, Serial No. 208,483

5 Claims. (Cl. 280—491)

My invention relates to an automobile trailer hitch and has particular reference to a hitch which is adapted to be permanently secured to an automobile and which comprises a draw head with a draw bar rotatably and longitudinally movably mounted therein which can be carried by an automobile at all times and the draw bar placed in a plurality of positions in one of which it is ready to receive the connecting member of the trailer and in the other position the draw head of the draw bar is in a position parallel with the bumper of the automobile and slightly below it, so that for practical purposes it is out of sight and is also in position where obstructions over which the automobile may pass will not readily engage the draw bar.

The traction hitch of the present application is a modified form of a hitch covered by my copending application filed May 31, 1949, and bearing Serial No. 96,174 but differing therefrom in certain details of construction with respect to the mounting of the draw bar, both in its operative and inoperative positions.

Another and further object of my invention is the provision of a trailer hitch which in effect enables an elastic pull to be put on the trailer and also is so designed that the force of the forward thrust of the connecting member of the trailer on the draw bar is communicated through the traction hitch to the automobile in such fashion that the force of the thrust is partially absorbed by the shock absorbers of the automobile, thereby eliminating the sharp shocks sustained by the automobile in both the starting and stopping operations when a trailer is being pulled by the automobile.

Another and further object of my invention is the provision of a trailer hitch which is readily adjustable from an inoperative to an operative position without the use of tools, wrenches, or the like and is also easily and quickly turned to inoperative position from its operative position for access to the trunk if desired and also to create an improved appearance of the automobile, without the use of tools or the like.

Another and further object of my invention is the provision of an improved mounting of the draw bar in a draw head in such manner that if the connecting means for the draw head and draw bar is sheared off or gives away for any reason allowing the draw bar to slip to a minor degree in the draw head, the draw bar will still be held in an operative position and will function both for pulling a trailer and also resisting its forward thrust without damage to either the trailer or the automobile.

Another and further object of my invention is the provision of a trailer hitch which can be easily and quickly attached to a conventional automobile without the material addition of attaching parts and if desired can be easily and quickly removed therefrom without a great deal of difficulty or trouble.

Another and further object of my invention is the provision of a trailer hitch which is so positioned on the body of the automobile that it is well above the normal clearance of the differential housing of the automobile so that it will not engage road obstructions, or should the automobile wheels travel into deep ruts and the chassis of the automobile come in contact with the ground surface below the trailer hitch, it would not be detached or will not easily become unlatched resulting in possible damage to both the trailer and the automobile.

Another and further object of my invention is the provision of a trailer hitch in which the point of attachment of the draw bar to the connecting member of a trailer is at a height corresponding to substantially a level position of the trailer body and the connecting member of the trailer will be substantially horizontal, thereby resulting in a more direct pull on the trailer, and not easily subject the lading of the trailer to displacement due to sudden stops or starts or the road shocks incurred in operation of the device with the trailer body tilted forward as is common with most trailers when drawn by an automobile.

These and other objects of my invention will be better and more fully understood by reference to the accompanying drawings, and in which—

Figure 1 is a top plan view of my improved trailer hitch attached to an automobile;

Figure 2 is a side elevational view of the device shown in Figure 1;

Figure 3 is a plan view of the operating parts of the device shown in Figures 1 and 2 showing the draw bar in operative position and the locking bar therefor in open position;

Figure 4 is a view similar to Figure 3 showing the draw bar in retracted position and the locking bar in engagement therewith;

Figure 5 is a detail elevational view of the operating parts of the device showing the draw bar in inoperative position.

Referring now specifically to the drawings and in which like reference characters refer to like parts throughout, a draw head 10 is shown having a round bore 11 therein extending longitudinally therethrough and having its side and top wall cut out as at 12 and also having a cutout slot 13 in the side wall thereof which extends forwardly of the cutout 12, the cutout 12 communicating with a second cutout portion 14 in the top of the head 10, the cutout 14 being slightly longer than is the cutout 12 at the side of the draw head 10 and on its top at one side, whereby a shoulder portion 15 is formed toward the front end of the draw head 10 and a shoulder 16 is formed at the rear end of the cutout 14 for purposes which will be hereinafter more fully described.

A draw bar is provided having a shaft portion 17 round in cross section mounted in the bore 11 in the draw head 10 and projects forward of the draw head 10 with spring 18 mounted thereon and washer 19 on the end of the shaft portion 17 providing an abutment for the spring 18 which is held in position by a bolt 20 placed in the end of the shaft portion 17, the spring 18 being a compression spring and normally tending to push the shaft portion 17 forward and toward the automobile. At the rear end of the shaft portion 17 a bar 21 is provided which is secured to the shaft portion 17 in any approved manner or may be integrally formed therewith, the bar having a head 22 integrally formed thereon, with a portion 23 being provided which is circular in cross section and has a hinged link 24 connected thereto for receiving the connecting member of a trailer, such as a tongue, draw bar, or the like. The link 24 is hinged to the head 22 by means of a pin 25 and has a bore 26 therein within which a shank 27 of a ring member 28 extends, this shank having a spring 29 mounted thereon with the end of the shank 27 extending into a recess 30 formed in the head 22 of the shank so that when the link 24 is in closed position it is held in this position by the shank 27 extending into the recess 30. A pin 30a is provided which extends through the shank 27 and forms a retaining member for the spring 29 mounted in the bore 26. A projection 31 is provided on the link 24 which overlaps an ear 32 on the side of the ring 28 with an opening 33 passing through both the projection 31 and the ear 32 through which the bow of a padlock may be passed if desired, thereby locking the portions 23 and ring 28 together over a trailer ring or connecting member on the tongue of the trailer to prevent easy detaching of the trailer from the hitch.

A pair of braces 34 and 35 are provided which are secured at one of their ends to each side of the draw head 10 by means of bolts 36, 36 and are upturned at their rear ends and are secured by means of bolts 37, 37 to a cross frame member 38 of the automobile. A plate 39 is secured to the top of the draw head 10 and has end portions which extend slightly beyond the sides of the draw head 10 with openings therethrough to which braces 40 and 41 are secured by means of bolts 42, 42, the braces at their rear ends being secured to the bumper bar 43 by means of bolts 44, 44. A plate 45 is secured to the underside of the draw head 10 near its rear end, the plate 45 having elongated openings 46, 46 in each side thereof within which safety chains may be attached and extending to the trailer if desired. A bracket 47 is secured to the upper side of the draw head 10 having a bolt 48 at the upper end thereof which extends through the horizontal portion of the bumper bar 43, thereby securely anchoring the draw head 10 to the bumper bar 43 and to the automobile frame by the braces 34 and 35, so that it is in position to resist a thrust from a plurality of directions and provides safe and secure means for attaching the device to the automobile.

A bracket 49 is provided which consists of a base 50 which is secured to the side of the draw head 10 by bolts 51, 51, and two spaced arms 52 and 53 integrally formed with the base 50, with an L-shaped lever 54 mounted between the ends of the spaced arms 52 and 53. The lever 54 has a handle portion at one end and two spaced arm portions 55 and 56 at its opposite end with a bolt 57 passing through the arm portions 55 and 56 and through the arms 52 and 53 of the bracket 49. The arms 55 and 56 have the flattened end of a locking bar 58 positioned therebetween with a pin 59 being mounted in the flattened end of the locking bar 58 in slots 60, 60 formed in the ends of the arm portions 55 and 56 of the lever 54. The locking bar 58 extends through a hollow trunnion 61 on the side of the draw head 10 and in normal position through registering holes 62 and 63 in each side of the draw head 10, and also through an opening 64 extending transversely through the shaft portion 17 of the draw bar when the device is in inoperative position.

An opening 65 is also provided transversely through the shaft portion 17 which extends at right angles to the opening 64 and is adapted to receive the locking bolt 58 when the shaft 17 is in its rearward position and the bar 21 is turned to vertical operative position to receive the tongue of a trailer when the opening 65 will be in register with the openings 62 and 63 and in position to receive the locking bar 58. A spring 66 is provided which has one end in abutment with the locking bar 58, and is coiled about the bolt 57 with a portion extending toward the draw head 10 with its end 67 angularly disposed and anchored against the side of the arm 52 forming a part of the bracket 49. One portion of the spring 66 is mounted between the arms 52 and 53 of the bracket 49 while the other end portion is mounted between the arms 55 and 56 forming a part of the lever 54.

In operation the device is exceedingly simple in that the complete structure in its assembled form can be placed in position on an automobile by attaching the braces 34 and 35 to the frame member 38 of the automobile and securing the brackets 40 and 41 to the bumper bar with the bracket 47 also being secured to the horizontal portion of the bumper bar 43. Assuming that the device is in its operative position and it is desired to attach a trailer thereto, the lever 54 is grasped by the operator and moved in a counterclockwise direction, as shown particularly in Figure 3, resulting in the withdrawal of the locking bolt 58 from the opening 64 in the shaft portion 17 of the draw bar, whereupon an outward pull is exerted upon the bar 21 until the draw bar is withdrawn to a position where the bar 21 is midway of the opening 12 whereupon by force exerted on the bar 21 in a counterclockwise direction, the draw bar is turned with the operator meanwhile releasing the handle 54, so that the spring 18 exerting an inward pull on on the shaft portion 17 pulls the shaft portion 17 and the bar 21 longitudinally of the slot 14, so that the forward edge of the bar 21 is at the forward edge of the slot 14 and behind the shoulder 15 in which position the locking pin 58 is in register with the opening 65 and will automatically be forced into position through the openings 63 and 64 and into the opening 62 thereby holding the draw bar shank and head in vertical position to receive the link on the end of a tongue or connecting bar of an automobile which is placed in the opening formed by the portions 23 and 24 of the head 22. The hinged portion 24 can be opened by an outward pull on the ring 28 withdrawing the pin 27 from the recess 30 so the link can be easily placed in position and once hinged portion 24 is in position the link is closed with the pin automatically being forced into the recess 30 by the spring 29 and, if desired, the bow of a padlock can be inserted through the opening 33, thereby locking the draw bar to the connecting link in the end of a tongue or connecting bar of the trailer. When in this position the connecting bar is in substantially a horizontal position, so that both forward and backward thrusts are imparted to the automobile body in an indirect manner with a rearward pull tending to force the traction device downward along with the rear end of the automobile against the springs of the automobile, while a forward thrust would be in the opposite direction with a force being imparted largely to the shock absorbers of the automobile, so that in effect both backward and forward thrusts of the connecting bar or tongue of the trailer is taken up either by the springs or by the shock absorbers of the automobile which results in less danger of breaking and easier operation of the trailer as well as additional comfort to any passengers carried by the automobile. If for any reason the locking bolt should become sheared the draw bar would thereupon move backward until the shank engages behind the shoulder 16, so that the device would continue to function unless a severe sidewise movement should be made to throw the bar 21 to one side which would be unlikely but which if it would occur would attract the attention of the driver, so that repairs could be made without damage to the automobile, trailer hitch, or to the trailer. When it is desired to disconnect the trailer the reverse operation takes place in that the connecting link or ring on the end of the tongue or draw bar of the trailer should be removed from the head on the draw bar handle 54, grasped by the operator until the locking pin 58 is withdrawn clear of the shaft portion 17 of the draw bar whereupon the draw bar is pulled backward out of the locked position in the cut out portion 14 until it is free to be turned in a clockwise direction to a horizontal position and upon being released will be withdrawn to the position shown particularly in Figure 4 of the drawings by the action of the spring 18, in which position the bar 21 will engage against the draw head 10 of the locking pin 58, will be automatically forced into position through the opening 64 and into the opening 62 by the spring 66 thereby locking the draw bar in position in the draw head so that the shank portion is parallel with and substantially underneath the bumper bar where it is out of the way for opening and closing the trunk and is also not conspicuous so far as appearance is concerned so that the automobile presents its normal appearance.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the appended claims.

What is claimed is:

1. A trailer hitch for automobiles comprising in combination a draw head having a central bore longitudinally thereof and having a cut-out portion at its side and top at its rear end, attaching means whereby the said draw head is secured to an automobile, a draw bar mounted in the said draw head having a shank at its rear end extending at right angles to the portion mounted in the draw head, the shank having a connecting head thereon offset a substantial distance from the longitudinal axis of the draw bar, the said draw bar extending forwardly of the draw head, a spring on the said draw bar normally tending to retract the draw bar, a locking pin in the said draw head, the draw bar having a plurality of holes transversely therethrough at right angles to each other for the reception of the locking pin and pivotally mounted lever on said draw head connected to the said locking pin.

2. A trailer hitch for automobiles comprising in combination a draw head having a central bore longitudinally thereof and having a cut-out portion at its side and top at its rear end, attaching means whereby the said draw head is secured to an automobile, a draw bar mounted in the said draw head having a shank at its rear end extending at right angles to the portion mounted in the draw head, the shank having a connecting head thereon offset a substantial distance from the longitudinal axis of the draw bar, the said draw bar extending forwardly of the draw head, a spring on the said draw bar normally tending to retract the draw bar, a locking pin in the said draw head, the draw bar having a plurality of holes transversely therethrough at right angles to each other for the reception of the locking pin, a pivotally mounted lever on said draw head connected to the said locking pin, and a spring on said lever normally tending to force the locking pin into position through the draw bar.

3. A trailer hitch for automobiles comprising in combination a draw head having a central bore longitudinally thereof and having a cut-out portion at its side and top at its rear end and having shoulder portions formed adjacent the recess on the top portion of the said draw head, attaching means whereby the said draw head is secured to an automobile, a draw bar mounted in the said draw head having a shank at its rear end extending at right angles to the portion mounted in the draw head, the shank having a connecting head thereon offset a substantial distance from the longitudinal axis of the draw bar, the said draw bar extending forwardly of the draw head, a spring on the said draw bar normally tending to retract the draw bar, a locking pin in the said draw head, the draw bar having a plurality of holes transversely therethrough at right angles to each other for the reception of the locking pin, a pivotally mounted lever on said draw head connected to the said locking pin, and a spring on said lever normally tending to force the locking pin into position through the draw bar.

4. A trailer hitch comprising a draw head having a longitudinal bore therein, means whereby the said draw head is connected to an automobile, a draw bar comprising a shaft portion and a bar portion extending at right angles to said shaft portion having a hitching head formed thereon, the shaft portion being longitudinally and rotatably movable in the bore in the draw head and having an end portion projecting forwardly from the said draw head and having spaced transverse openings therein, the draw head having a longitudinally extending slot therein for a portion of its length to receive the bar portion of the draw bar when in retracted position, the said draw head also having a recess therein in communication with the slot at one of its ends within which recess the bar portion of the draw bar is rotatably mounted, a locking bolt extending transversely of the said draw head and adapted to selectively pass through one of the openings in the shaft portion of the draw bar whereby the draw bar is locked in operative or inoperative retracted position, and a spring on the projecting end of the shaft portion of the draw bar whereby the draw bar is drawn into retracted position.

5. A trailer hitch comprising a draw head having a longitudinal bore therein, means whereby the said draw head is connected to an automobile, a draw bar comprising a shaft portion and a bar portion extending at right angles to said shaft portion having a hitching head formed thereon at a material distance from the longitudinal axis of the shaft portion of the draw bar, the shaft portion being longitudinally and rotatably movable in the bore in the draw head and having an end portion projecting forwardly from the said draw head and having spaced transverse openings therein, the draw head having a longitudinally extending slot therein for a portion of its length to receive the bar portion of the draw bar when in retracted position, the said draw head also having a recess therein in communication with the slot at one of its ends within which recess the bar portion of the draw bar is rotatably mounted, a locking bolt extending transversely of the said draw head and adapted to selectively pass through one of the openings in the shaft portion of the draw bar whereby the draw bar is locked in operative or inoperative retracted position, and a spring on the projecting end of the shaft portion of the draw bar whereby the draw bar is drawn into retracted position.

PAUL L. PERRY.

References Cited in the file of this patent

UNITED STATES PATENTS

| Number | Name | Date |
|---|---|---|
| 1,804,973 | Duty | May 12, 1931 |
| 2,179,439 | Trow | Nov. 7, 1939 |
| 2,309,850 | Klawitter | Feb. 2, 1943 |
| 2,340,786 | Winn | Feb. 1, 1944 |
| 2,569,086 | Zenk | Sept. 25, 1951 |